United States Patent
Tang et al.

(10) Patent No.: US 10,023,789 B2
(45) Date of Patent: Jul. 17, 2018

(54) ENHANCING COMPLEX FRACTURE NETWORKS IN SUBTERRANEAN FORMATIONS

(71) Applicant: Halliburton Energy Services, Inc., Houston, TX (US)

(72) Inventors: Tingji Tang, Spring, TX (US); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/314,802

(22) PCT Filed: Sep. 2, 2014

(86) PCT No.: PCT/US2014/053650
§ 371 (c)(1),
(2) Date: Nov. 29, 2016

(87) PCT Pub. No.: WO2016/036343
PCT Pub. Date: Mar. 10, 2016

(65) Prior Publication Data
US 2017/0190960 A1    Jul. 6, 2017

(51) Int. Cl.
| | |
|---|---|
| *E21B 43/26* | (2006.01) |
| *C09K 8/80* | (2006.01) |
| *C09K 8/62* | (2006.01) |
| *C09K 8/516* | (2006.01) |
| *E21B 43/267* | (2006.01) |

(52) U.S. Cl.
CPC ............... *C09K 8/80* (2013.01); *C09K 8/516* (2013.01); *C09K 8/62* (2013.01); *E21B 43/26* (2013.01); *E21B 43/267* (2013.01)

(58) Field of Classification Search
CPC .. C09K 8/80; C09K 8/62; E21B 43/26; E21B 43/267
USPC ........................................................ 166/280.2
See application file for complete search history.

(56) References Cited

U.S. PATENT DOCUMENTS

| | | | |
|---|---|---|---|
| 4,078,609 A * | 3/1978 | Pavlich ................ | E21B 33/138 166/271 |
| 4,982,793 A | 1/1991 | Holtmyer et al. | |
| 5,067,565 A | 11/1991 | Holtmyer et al. | |
| 5,122,549 A | 6/1992 | Holtmyer et al. | |

(Continued)

FOREIGN PATENT DOCUMENTS

| | | |
|---|---|---|
| EP | 2527586 A1 | 11/2012 |
| WO | 2007078995 A1 | 7/2007 |
| WO | 2016036343 A1 | 3/2016 |

OTHER PUBLICATIONS

International Search Report and Written Opinion for PCT/US2014/053650 dated May 22, 2015.

*Primary Examiner* — Silvana C Runyan
(74) *Attorney, Agent, or Firm* — McDermott Will & Emery LLP

(57) ABSTRACT

Methods of introducing into a subterranean formation a series of treatment fluids comprising one of micro-proppant particulates, micro-degradable particulates, branch-proppant particulates, branch-degradable particulates, main-proppant particulates, and main-degradable particulates and placing the particulates into portions of microfracture(s), branch fracture(s), and main fracture(s) to increase fracture complexity of a fracture network in the subterranean formation.

20 Claims, 2 Drawing Sheets

(56) References Cited

U.S. PATENT DOCUMENTS

| | | | |
|---|---|---|---|
| 6,287,639 | B1 | 9/2001 | Schmidt et al. |
| 7,213,651 | B2 * | 5/2007 | Brannon .................. C09K 8/62 |
| | | | 166/177.5 |
| 7,825,074 | B2 | 11/2010 | Schmidt et al. |
| 8,109,335 | B2 | 2/2012 | Luo et al. |
| 2005/0236161 | A1 * | 10/2005 | Gay ...................... E21B 17/206 |
| | | | 166/380 |
| 2005/0274523 | A1 | 12/2005 | Brannon et al. |
| 2011/0120712 | A1 | 5/2011 | Todd et al. |
| 2012/0125617 | A1 | 5/2012 | Gu et al. |
| 2013/0025867 | A1 | 1/2013 | Sun et al. |
| 2013/0048282 | A1 | 2/2013 | Adams et al. |
| 2013/0105157 | A1 | 5/2013 | Barmatov et al. |
| 2013/0284437 | A1 | 10/2013 | Nguyen et al. |

* cited by examiner

ENHANCING COMPLEX FRACTURE NETWORKS IN SUBTERRANEAN FORMATIONS

BACKGROUND

The present disclosure relates to enhancing complex fracture networks in subterranean formations, and, more particularly, to enhancing complex fracture networks in the far-field region of the subterranean formation.

Hydrocarbon producing wells (oil producing wells, gas producing wells, and the like) are often stimulated by hydraulic fracturing treatments. In traditional hydraulic fracturing treatments, a treatment fluid, sometimes called a carrier fluid in cases where the treatment fluid carries particulates entrained therein, is pumped into a portion of a subterranean formation (which may also be referred to herein simply as a "formation") at a rate and pressure sufficient to break down the formation and create one or more fractures therein. As used herein, the term "treatment fluid" refers generally to any fluid that may be used in a subterranean application in conjunction with a desired function and/or for a desired purpose. The term "treatment fluid" does not imply any particular action by the fluid or any component thereof.

Typically, particulate solids, such as graded sand, are suspended in a portion of the treatment fluid and then deposited into the fractures. The particulate solids, known as "proppant particulates" or simply "proppant" serve to prevent the fractures from fully closing once the hydraulic pressure is removed. By keeping the fractures from fully closing, the proppant particulates form a proppant pack having interstitial spaces which act as conductive paths through which fluids produced from the formation may flow. The degree of success of a stimulation operation depends, at least in part, upon the ability of the proppant pack to permit the flow of fluids through the interconnected interstitial spaces between proppant particulates.

In the case of stimulating low permeability formations, such as shale reservoirs or tight-gas sands, increasing fracture complexity, as opposed to proppant pack conductivity, during stimulation may further enhance the production of the formation. Low permeability formations, such as those described herein, tend to have a naturally occurring network of multiple, interconnected fractures referred to as "fracture complexity." As used herein, the term "low permeability formation" refers to a formation that has a matrix permeability of less than 1,000 microDarcy (equivalent to 1 milliDarcy). As used herein, the term "ultra-low permeability formation" refers to a formation that has a matrix permeability of less than 1 microDarcy (equivalent to 0.001 milliDarcy).

As used herein, the term "fracture network" refers to the access conduits, man-made or otherwise, within a subterranean formation that are in fluid communication with a wellbore. The complexity of the fracture network (or "network complexity") may be enhanced by stimulation (e.g., fracturing) operations to create new or enhance (e.g., elongate or widen) existing fractures. In some cases, the newly formed fractures may remain open without the assistance of proppant particulates due to shear offset of the formation forming the fractures (i.e., the formation in which the fracture is formed does not close perfectly, thereby leaving channels). In other cases, the fractures may be held open by proppant particulates or varying sizes, depending type of fracture (i.e., depending on the size of the fracture). The inclusion of proppant particulates in the fractures—new or natural—may increase the conductivity of a low permeability formation.

BRIEF DESCRIPTION OF THE DRAWINGS

The following figures are included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
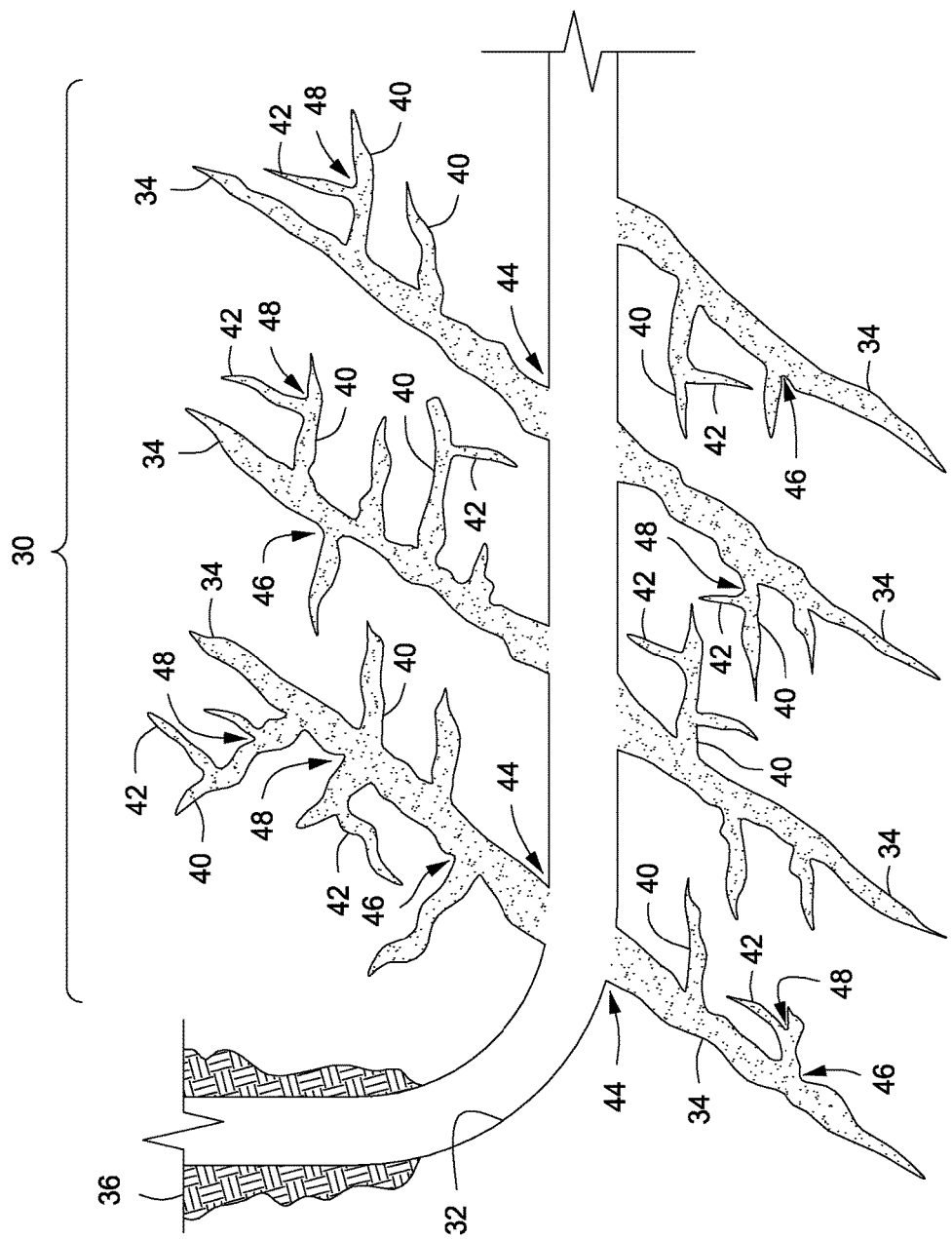
FIG. 1 depicts a non-limiting example of a fracture network according to one or more embodiments disclosed herein.

The present disclosure relates to enhancing complex fracture networks in subterranean formations, and, more particularly, to enhancing complex fracture networks in the far-field region of the subterranean formation. As used herein, the term "far-field region" refers to a portion of a fracture network beyond a main fracture tip.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of"

or "consist of" the various components and steps. When "comprising" is used in a claim, it is open-ended.

Increasing fracture complexity in subterranean formations, particularly in tight subterranean formations, may increase the conductivity and productivity of the formation. The permeability of a formation is a measure of the formation's resistance to through-flow fluid. Thus, low permeability formations require considerable applied pressure in order to flow fluid through the formation, as compared to formations having higher permeabilities.

Examples of such low permeability formations include, but are not limited to, shale reservoirs and tight-gas sands. Shale reservoirs are sources of hydrocarbons comprising complex, heterogeneous rock with low permeability. Shale reservoirs are known to have permeabilities of about 0.001 milliDarcy ("mD") ($9.869233 \times 10^{-19}$ $m^2$) or less, and even about 0.0001 mD ($9.869233 \times 10^{-20}$ $m^2$) or less. Tight-gas sands are low permeability formations that produce mainly dry natural gas and may include tight-gas carbonates, tight-gas shales, coal-bed methane, and the like. Tight-gas sands may have permeabilities as low as about 1 mD ($9.869233 \times 10^{-16}$ $m^2$) or less, and even as low as about 0.01 mD ($9.869233 \times 10^{-18}$ $m^2$) or less.

The embodiments described employ treatment fluids and sized proppant and degradable particulates for enhancing complex fracture networks in subterranean formations, including tight formations, as compared to conventional operations, thereby maximizing the stimulated reservoir volume. As used herein, the term "degradable" and all of its grammatical variants (e.g., "degrade," "degradation," "degrading," and the like) refers to the dissolution or chemical conversion of materials into smaller components, intermediates, or end products by at least one of solubilization, hydrolytic degradation, biologically formed entities (e.g., bacteria or enzymes), chemical reactions, electrochemical processes, thermal reactions, or reactions induced by radiation. In some instances, the degradation of the material may be sufficient for the mechanical properties of the material to reduce to a point that the material no longer maintains its integrity and, in essence, falls apart.

The method and compositions described herein result in a three-layer structure of "fracture complexity" including main fractures, branch fractures, and microfractures, as depicted in FIG. 1. The term "main fracture," as used herein refers to a primary fracture extending from a wellbore, generally having a length in the range of from a lower limit of about 3 meters ("m"), 18 m, 33 m, 48 m, 63 m, 78 m, 93 m, 108 m, 123 m, 138 m, and 153 m to an upper limit of about 300 m, 285 m, 270 m, 255 m, 240 m, 225 m, 210 m, 195 m, 180 m, 165 m, and 150 m (equivalent to about 10 feet to about 1000 feet), encompassing any value and subset therebetween. As used herein, the term "branch fracture" refers to a secondary fracture extending from a main fracture and generally having a diameter in the range of from a lower limit of about 1.5 m, 3 m, 4.5 m, 6 m, 7.5 m, 9 m, 10.5 m, 12 m, 13.5 m, and 15 m to an upper limit of about 30 m, 28.5 m, 27 m, 25.5 m, 24 m, 22.5 m, 21 m, 19.5 m, 18 m, 16.5 m, and 15 m (equivalent to about 5 feet to about 100 feet), encompassing any value and subset therebetween. A "microfracture" as used herein refers to tertiary fracture extending from a branch fracture and generally having the a diameter in the range of from a lower limit of about 0.3 m, 0.9 m, 1.5 m, 2.1 m, 2.7 m, 3.3 m, 3.9 m, 4.5 m, 5.1 m, 5.7 m, 6.3 m, 6.9 m, and 7.5 to an upper limit of about 15 m, 14.4 m, 13.8 m, 13.2 m, 12.6 m, 12 m, 11.4 m, 10.8 m, 10.2 m, 9.6 m, 9 m, 8.4 m, 7.8 m, and 7.2 m (equivalent to about 1 feet to about 50 feet), encompassing any value and subset therebetween. Accordingly, each of the main fractures, branch fractures, and microfractures decrease progressively in length. As used herein, unless otherwise stated, the term "fracture" or "fractures" will refer collectively to main fractures, branch fractures, and microfractures. The width of the fractures may be dictated by closures after hydraulic pressure is removed.

Referring to FIG. 1, a fracture network 30 is shown. As depicted, one or more main fractures 34 (seven shown) extend from a wellbore 32 in a subterranean formation. As depicted the wellbore 32 has a substantially (i.e., largely but not necessarily wholly) vertical portion in relation to the surface 36 and a substantially horizontal (or parallel) portion in relation to the surface 36. However, it will be appreciated that the methods and compositions described herein may be used with any type of wellbore configuration including vertical wellbores and deviated wellbores of any shape and angular relationship to the surface. Additionally, wellbores having multiple vertical, horizontal, and/or deviated sections may be employed, without departing from the scope of the present disclosure. Moreover, although the wellbore 32 is depicted in FIG. 1 as uncased (i.e., open hole), any portion or the entirety of the wellbore 32 may be cased and/or cemented, without departing from the scope of the present disclosure.

Although seven main fractures 34 are depicted in FIG. 1, any number of main fractures may be formed in a wellbore (i.e., one or more), without departing from the scope of the present disclosure. The number of main fractures may depend, at least in part, on the size of the wellbore, the size of the treatment zone of interest, the fracturing pump pressure and rate, and the like. Extending from one or more of the main fractures may be one or more branch fractures 40. In some instances of the present disclosure a single branch fracture 40 may extend from a single main fracture 34. In other instances, multiple branch fractures 40 may extend from a single main fracture 34, and although FIG. 1 depicts a maximum of four branch fractures 40 extending from a single main fracture 40, additional branch fractures 40 may extend therefrom, without departing from the scope of the present disclosure. Extending from the one or more branch fractures may be one or more microfractures 42. In some instances a single microfracture 42 or any number of additional microfractures 42 may extend from a single branch fracture 40, without departing from the scope of the present disclosure.

At the juncture between a main fracture 34 and the wellbore 32 is the mouth 44 of the main fracture 34. As used herein, the term "mouth" of a fracture (i.e., main, branch, or microfracture) refers to a fracture opening (e.g., at the wellbore 32 surface). At the juncture between a main fracture 34 and a branch fracture 40 is the mouth 46 of the branch fracture 40. Similarly, between the branch fracture 40 and the microfracture 42 is the mouth 48 of the microfracture 42.

In some embodiments, the present disclosure provides a method of increasing fracture conductivity comprising introducing into a subterranean formation (i.e., through a wellbore) a first treatment fluid comprising a first base fluid and micro-proppant particulates at a rate and pressure in a first treatment zone therein sufficient to create or enhance at least a first main fracture 34 (i.e., a pressure at or above the "fracture gradient"). The first main fracture 34 further includes a first branch fracture 40 extending therefrom and a first microfracture 42 extending from the first branch fracture 40, forming a fracture network 30. The micro-proppant particulates have a particle size distribution such that the micro-proppant particulates are deposited into the first microfracture 42 (whether formed from the introduction of the first treatment fluid or naturally occurring and extending from the first branch fracture) so as to form at least a partial monolayer therein (i.e., may form bilayers in some embodiments). As used herein, the term "partial monolayer" refers to a type of proppant pack, in which the proppant particulates are widely spaced but are still capable of holding the fracture open, wherein the separation between the fracture faces may be less than, or about the same, as the largest exterior dimension of any one of the proppant particulates.

Thereafter a second treatment fluid comprising a second base fluid and micro-degradable particulates is introduced into the subterranean formation. The micro-degradable particulates have a particle size distribution such that they are deposited into the mouth 48 of the first microfracture 42, thereby forming at least a partial seal therein. As used herein, the term "partial seal" and grammatical variants thereof (e.g., "partially seal") refers to substantially (i.e., largely but not necessarily wholly) sealing off a portion of a subterranean formation thereby reducing, including blocking, fluid flow therethrough. In some embodiments, a partial seal may reduce or block fluid flow by at least 50% or more. The micro-degradable particulates accordingly form at least a partial seal to later injected treatment fluids from flowing into the first microfracture 42, thereby diverting fluid to other fractures (e.g., to create other microfractures when subsequent treatment fluids are introduced).

After introducing the second treatment fluid and forming a partial seal in the mouth 48 of the first microfracture 42, a third treatment fluid is introduced into the subterranean formation. The third treatment fluid comprises a third base fluid and branch-proppant particulates. The branch-proppant particulates have a particle size distribution such that they are deposited into the first branch fracture 40 so as to form at least a partial monolayer therein.

A fourth treatment fluid is thereafter introduced into the subterranean formation, the fourth treatment fluid comprising a fourth base fluid and branch-degradable particulates. The branch-degradable particulates have a particle size distribution such that the branch-degradable particulates are deposited into the mouth 46 of the first branch fracture 40, thereby forming at least a partial fluid seal therein. The at least partial seal in the mouth 46 of the first branch fracture 40 thereby diverts subsequent treatment fluids from flowing into the first branch fracture 40 and to other fractures (e.g., to create other branch fractures when subsequent treatment fluids are introduced).

Next, a fifth treatment fluid comprising a fifth base fluid and main-proppant particulates is introduced into the subterranean formation. The main-proppant particulates have a particle size distribution such that they are deposited into the first main fracture 34 to form at least a partial monolayer therein.

Thereafter, the micro-degradable particulates and the branch-degradable particulates are degraded to remove the at least a portion of the partial seal formed in the mouth 48 of the first microfracture 42 and the mouth 46 of the first branch fracture 40, respectively. Accordingly, each of the at least partial monolayers formed in the first microfracture 42, the first branch fracture 40, and the first main fracture 34 permit produced fluids to flow therethrough, into the wellbore 32, and to the surface 36.

In some embodiments, the steps of introducing the first treatment fluid and the second treatment fluid may be repeated one or more times at at least a second treatment zone in the subterranean formation prior to the step of introducing the third treatment fluid, so as to form at least a second microfracture 42 in the first branch fracture 40. Similarly, in some embodiments, the steps of introducing the third treatment fluid and the fourth treatment fluid may be repeated one or more times at at least a second treatment zone in the subterranean formation prior to the step of introducing the fifth treatment fluid, so as to form at least a second branch fracture 40 in the first main fracture 34.

In some embodiments, prior to degrading the micro-degradable and the branch-degradable particulates, and after the step of introducing the fifth treatment fluid, a sixth treatment fluid may be introduced into the subterranean formation. The sixth treatment fluid comprises a sixth base fluid and main-degradable particulates. The main-degradable particulates have a particle size distribution such that they are deposited into the mouth 44 of the first main fracture 34, thereby forming at least a partial fluid seal therein. The at least partial seal in the mouth 44 of the first main fracture 34 thereby diverts subsequent treatment fluids from flowing into the first main fracture 34 and to other fractures (e.g., to create other main fractures when subsequent treatment fluids are introduced).

Each of the steps of introducing the first through the fifth treatment fluids, or the first through sixth treatment fluids, may be repeated at one or more additional treatment zones (e.g., at a second treatment zone, at a third treatment zone, and the like) in the subterranean formation so as to increase the fracture complexity thereof. The repeat treatments may be performed either before or after degradation of the micro-degradable particulates and the branch-degradable particulates, or may be performed at some point during the degradation of the micro-degradable and branch-degradable particulates.

In some embodiments, the first treatment fluid is introduced at a rate and pressure sufficient to form in the first treatment zone at least on first main fracture 34, at least one first branch fracture 40, and at least on first microfracture 42. In other embodiments, each of or any combination of one or more of the first through sixth treatment fluids described herein may be introduced either at, above, or below the fracture gradient of the particular subterranean formation being treated.

The micro-proppant particulates, branch-proppant particulates, and main-proppant particulates described in the present disclosure may collectively be referred to as "proppant particulates." The micro-degradable particulates, branch-degradable particulates, and main-degradable particulates may be referred to herein collectively as "degradable particulates." Both the proppant particulates and the degradable particulates may be of any shape suitable for use in a subterranean formation operation to prop open a fracture. In some embodiments, the proppant particulates and degradable particulates may be substantially (i.e., largely but not necessarily wholly) spherical in shape. In some embodiments, the proppant particulates and the degradable particulates may be substantially non-spherical, such as, for example, cubic-shaped, rectangular-shaped, rod-shaped, ellipse-shaped, cone-shaped, pyramid-shaped, or cylinder-shaped. Any combination of substantially spherical and substantially non-spherical proppant particulates and degradable particulates may be used in accordance with the embodiments herein, without departing from the scope of the present disclosure.

Proppant particulates suitable for use in the present invention may comprise any material suitable for use in subterranean operations. Suitable materials for these proppant particulates may include, but are not limited to, sand, bauxite, ceramic materials, glass materials, polymer materials (such as EVA or composite materials), polytetrafluoroethylene materials, nut shell pieces, cured resinous particulates comprising nut shell pieces, seed shell pieces, cured resinous particulates comprising seed shell pieces, cured resinous particulates comprising fruit pit pieces, wood, composite particulates, and any combination thereof. Suitable composite particulates may comprise a stabilizing agent and a filler material wherein suitable filler materials include silica, alumina, fumed carbon, carbon black, graphite, mica, titanium dioxide, barite, meta-silicate, calcium silicate, kaolin, talc, zirconia, boron, fly ash, hollow glass microspheres, solid glass, and any combination thereof. Suitable stabilizing agents for forming the composite proppant particulates may include, but are not limited to, non-aqueous tackifying agents, aqueous tackifying agents, silyl-modified polyamide compounds, resins, crosslinkable aqueous polymer compositions, polymerizable organic monomer compositions, consolidating agent emulsions, binders, and any combination thereof.

The degradable particulates for use in the embodiments of the present disclosure may, in some embodiments, be oil-degradable materials. Where such oil-degradable particulates are used, their degradation may be achieved by contact with naturally produced hydrocarbons from the subterranean formation. The oil-degradable materials (and other degradable materials described herein) forming the degradable particulates may also be degraded by materials purposely placed in the formation by injection, mixing the degradable material with delayed reaction degradation agents, or other suitable means to induce degradation.

Suitable oil-degradable materials include oil-degradable polymers. Oil-degradable polymers that may be used in accordance with the present disclosure may be either natural or synthetic polymers. Some particular examples include, but are not limited to, polyacrylics, polyamides, and polyolefins (e.g., polyethylene, polypropylene, polyisobutylene, and polystyrene). Other suitable oil-degradable polymers may include those that have a melting point which is such that the polymer will melt or dissolve at the temperature of the subterranean formation in which it is placed such as a wax material.

In addition to oil-degradable polymers, other degradable materials that may be used to form the degradable particulates described herein may include, but are not limited to, degradable polymers, dehydrated salts, and/or mixtures of the two. The degradability of a polymer depends, at least in part, on its backbone structure. For instance, the presence of hydrolyzable and/or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, additives, and the like. Also, the environment to which the polymer is subjected may affect how it degrades (e.g., temperature, presence of moisture, oxygen, microorganisms, enzymes, pH, and the like).

Suitable examples of degradable polymers that may include, but are not limited to, polysaccharides (e.g., dextran or cellulose), chitins, chitosans, proteins, aliphatic polyesters, poly(lactides), poly(glycolides), poly(ε-caprolactones), poly(hydroxybutyrates), poly(anhydrides), aliphatic polycarbonates, aromatic polycarbonates, poly(orthoesters), poly(amino acids), poly(ethylene oxides), polyphosphazenes, polyanhydrides (e.g., poly(adipic anhydride), poly(suberic anhydride), poly(sebacic anhydride), poly(dodecanedioic anhydride), poly(maleic anhydride), and poly(benzoic anhydride)), and any combination thereof. Of these suitable polymers, aliphatic polyesters and polyanhydrides may be preferred.

Dehydrated salts may also be used as a degradable material forming the degradable particulates described herein. A dehydrated salt is suitable for use in the present invention if it will degrade over time as it hydrates. For example, a particulate solid anhydrous borate material that degrades over time may be suitable. Specific examples of particulate solid anhydrous borate materials that may be used include, but are not limited to, anhydrous sodium tetraborate (also known as anhydrous borax), and anhydrous boric acid. These anhydrous borate materials are only slightly soluble in water. However, with time and heat in a subterranean environment, the anhydrous borate materials react with the surrounding aqueous fluid and are hydrated. The resulting hydrated borate materials are highly soluble in water as compared to anhydrous borate materials and as a result degrade in the aqueous fluid. In some instances, the total time required for the anhydrous borate materials to degrade in an aqueous fluid is in the range of from about 8 hours to about 72 hours depending upon the temperature of the subterranean zone in which they are placed. Other examples include organic or inorganic salts like acetate trihydrate.

Blends of certain degradable materials may also be suitable. One example of a suitable blend of materials is a mixture of poly(lactic acid) and sodium borate where the mixing of an acid and base could result in a neutral solution where this is desirable. Another example would include a blend of poly(lactic acid) and boric oxide. Other materials that undergo an irreversible degradation may also be suitable, if the products of the degradation do not undesirably interfere with either the conductivity of the proppant matrix or with the production of any of the fluids from the subterranean formation.

In choosing the appropriate degradable material, one should consider the degradation products that will result. These degradation products should not adversely affect other operations or components and may even be selected to improve the long term performance/conductivity of the propped fracture. The choice of degradable material also can depend, at least in part, on the conditions of the well (e.g., well bore temperature). For instance, lactides have been found to be suitable for lower temperature wells, including those within the range of about 15° C. to about 66° C. (about 60° F. to about 150° F.), and polylactides have been found to be suitable for wellbore temperatures above this range. Also, poly(lactic acid) may be suitable for higher temperature wells. Some stereoisomers of poly(lactide) or mixtures of such stereoisomers may be suitable for even higher temperature applications. Dehydrated salts may also be suitable for higher temperature wells.

In some embodiments, the degradable particulates placed in the mouths of the main, branch, and microfractures may be smaller in size compared to their proppant particulate counterpart (i.e., the micro-proppant and the micro-degradable particulates, etc.) to accommodate forming the at least partial seal therein (e.g., the smaller particulates may enter the interstitial spaces of the particulates in the fracture to form the at least partial seal).

The micro-proppant particulates of the present disclosure may have a particle size distribution in the range of between a lower limit of about 1 µm, 5 µm, 10 µm, 15 µm, 20 µm, 25

μm, 30 μm, 35 μm, 40 μm, 45 μm, 50 μm, 55 μm, 60 μm, 65 μm, 70 μm, and 75 μm to an upper limit of about 150 μm, 145 μm, 140 μm, 135 μm, 130 μm, 125 μm, 120 μm, 115 μm, 110 μm, 105 μm, 100 μm, 95 μm, 90 μm, 85 μm, 80 μm, and 75 μm, encompassing any value and subset therebetween. The micro-proppant particulates may be present in the first treatment fluid of the present disclosure in an amount in the range of from a lower limit of about 0.001%, 0.01%, 0.1%, 0.25%, 0.5%, 0.75%, 1%, 1.25%, 1.5%, 1.75%, 2%, and 2.25% to an upper limit of about 5%, 4.75%, 4.5%, 4.25%, 4%, 3.75%, 3.5%, 3.25%, 3%, 2.75%, 2.5%, 2.25% by weight of the first treatment fluid.

The micro-degradable particulates of the present disclosure may have a particle size distribution in the range of between a lower limit of about 0.1 μm, 0.5 μm, 1 μm, 5 μm, 10 μm, 15 μm, 20 μm, 25 μm, 30 μm, 35 μm, 40 μm, and 45 μm to an upper limit of about 100 μm, 95 μm, 90 μm, 85 μm, 80 μm, 75 μm, 70 μm, 65 μm, 60 μm, 55 μm, 50 μm, and 45 μm. The micro-degradable particulates may be present in the second treatment fluid of the present disclosure in an amount in the range of from a lower limit of about 0.001, 0.01%, 0.1%, 1%, 2%, 3%, 4%, 5%, 6%, 7%, 8%, 9%, and 10% to an upper limit of about 20%, 19%, 18%, 17%, 16%, 15%, 14%, 13%, 12%, 11%, and 10% by weight of the second treatment fluid.

The branch-proppant particulates described herein may have a particle size distribution in the range of between a lower limit of about 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, 200 μm, 210 μm, 220 μm, 230 μm, 240 μm, and 250 μm to an upper limit of about 350 μm, 340 μm, 330 μm, 320 μm, 310 μm, 300 μm, 290 μm, 280 μm, 270 μm, 260 μm, and 250 μm, encompassing any value and subset therebetween. The branch-proppant particulates may be present in the third treatment fluid of the present disclosure in an amount in the range of from a lower limit of about 0.001, 0.01%, 0.1%, 1%, 2%, 3%, 4%, 5%, 6%, 7%, 8%, 9%, and 10% to about 20%, 19%, 18%, 17%, 16%, 15%, 14%, 13%, 12%, 11%, and 10% by weight of the third treatment fluid.

The branch-degradable particulates of the present disclosure may have a particle size distribution in the range of between a lower limit of about 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, and 200 μm to an upper limit of about 300 μm, 290 μm, 280 μm, 270 μm, 260 μm, and 250 μm, 240 μm, 230 μm, 220 μm, 210 μm, and 200 μm, encompassing any value and subset therebetween. The branch-degradable particulates may be present in the fourth treatment fluid of the present disclosure in an amount in the range of from a lower limit of about 0.001, 0.01%, 0.1%, 1%, 2%, 3%, 4%, 5%, 6%, 7%, 8%, 9%, and 10% to an upper limit of about 20%, 19%, 18%, 17%, 16%, 15%, 14%, 13%, 12%, 11%, and 10% by weight of the fourth treatment fluid.

The main-proppant particulates of the present disclosure may have a particle size distribution in the range of between a lower limit of about 200 μm, 250 μm, 300 μm, 350 μm, 400 μm, 450 μm, 500 μm, 550 μm, 600 μm, 650 μm, and 700 μm to an upper limit of about 1250 μm, 1200 μm, 1150 μm, 1100 μm, 1050 μm, 1000 μm, 950 μm, 900 μm, 850 μm, 800 μm, 750 μm, and 700 μm, encompassing any value and subset therebetween. The main-proppant particulates may be present in the fifth treatment fluid of the present disclosure in an amount in the range of from a lower limit of about 0.001%, 0.01%, 0.1%, 1%, 2%, 4%, 6%, 8%, 10%, 12%, 14%, 16%, 18%, 20%, 22%, 14%, and 26% to an upper limit of about 50%, 48%, 47%, 46%, 44%, 42%, 40%, 38%, 36%, 34%, 32%, 30%, 28%, and 26% by weight of the fifth treatment fluid.

The main-degradable particulates described herein may have a particle size distribution in the range of between a lower limit of about 150 μm, 200 μm, 250 μm, 300 μm, 350 μm, 400 μm, 450 μm, 500 μm, 550 μm, 600 μm, 650 μm, 700 μm, and 750 μm to an upper limit of about 1200 μm, 1150 μm, 1100 μm, 1050 μm, 1000 μm, 950 μm, 900 μm, 850 μm, 800 μm, and 750 μm, encompassing any value and subset therebetween. The main-degradable particulates may be present in the sixth treatment fluid of the present disclosure in an amount in the range of from a lower limit of about 0.001%, 0.01%, 0.1%, 1%, 2%, 4%, 6%, 8%, 10%, 12%, 14%, 16%, 18%, 20%, 22%, 14%, and 26% to an upper limit of about 50%, 48%, 47%, 46%, 44%, 42%, 40%, 38%, 36%, 34%, 32%, 30%, 28%, and 26% by weight of the sixth treatment fluid.

Each of the first through sixth treatment fluids described herein comprise a first through sixth base fluid, respectively. As used herein, the term "base fluid" will collectively refer to each of the first through sixth base fluids of the first through sixth treatment fluids, unless otherwise indicated. The base fluids may be any fluid capable of delivering the proppant particulates and degradable particulates of the present disclosure to the requisite downhole location, as described herein. Suitable examples of base fluids for use in forming any of the treatment fluids described herein may include, but are not limited to, oil base fluids, aqueous base fluids, aqueous-miscible base fluids, water-in-oil emulsion base fluids, oil-in-water emulsion base fluids, and any combination thereof. Any one or more of the first through sixth base fluids may be identical or different with respect to the type of base fluid selected or the specific composition of the base fluid selected. For example, each of the first through sixth base fluids may be of the same general type (e.g., aqueous base fluid) but one or more may be different compositions of the general type of base fluid (e.g., brine, seawater, etc.).

Suitable oil base fluids may include, but are not limited to, alkanes, olefins, aromatic organic compounds, cyclic alkanes, paraffins, diesel fluids, mineral oils, desulfurized hydrogenated kerosenes, and any combination thereof. Aqueous base fluids may include, but are not limited to, fresh water, saltwater (e.g., water containing one or more salts dissolved therein), brine (e.g., saturated salt water), seawater, produced water, recycled water (e.g., from a treatment fluid previously used), or combinations thereof. Generally, the water may be from any source, provided that it does not contain components that might adversely affect the stability and/or performance of any of the treatment fluids described herein. In certain embodiments, the density of the aqueous base fluid can be adjusted, among other purposes, to provide additional transport and suspension of the proppant particulates and degradable particulates of the present disclosure. In certain embodiments, the pH of the aqueous base fluid may be adjusted (e.g., by a buffer or other pH adjusting agent), among other purposes, to activate a crosslinking agent and/or to reduce the viscosity of the first treatment fluid (e.g., activate a breaker, deactivate a crosslinking agent). In these embodiments, the pH may be adjusted to a specific level, which may depend on, among other factors, the types of additives included in the treatment fluid, as discussed below. In some embodiments, the pH range may preferably be from about 4 to about 11.

Suitable aqueous-miscible fluids may include, but are not limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous fluid described above, and any combination thereof.

Suitable emulsions for use in the present embodiments may have an oil-to-water ratio or a water-to-oil ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base treatment fluid, encompassing any value and subset therebetween. The oil and water portion of the emulsion may be selected from any of the oil base fluids, or aqueous or aqueous-miscible base fluids, described above.

In some embodiments, one or more of the first through sixth treatment fluids of the present disclosure may further comprise a viscosifying agent to aid in suspending the proppant particulates or degradable particulates. In certain embodiments, the viscosifying agent may comprise one or more polymers that have at least two molecules that are capable of forming a crosslink in a crosslinking reaction in the presence of a crosslinking agent, and/or polymers that have at least two molecules that are so crosslinked (i.e., a crosslinked viscosifying agent). The viscosifying agents may be naturally-occurring viscosifying agents, synthetic viscosifying agents, and any combination thereof. The viscosifying agents also may be cationic viscosifying agents, anionic viscosifying agents, and any combination thereof. Suitable viscosifying agents may include, but are not limited to, polysaccharides, biopolymers, any derivatives thereof that contain one or more of these monosaccharide units: galactose, mannose, glucoside, glucose, xylose, arabinose, fructose, glucuronic acid, pyranosyl sulfate, and any combination thereof (e.g., homopolymers, copolymers, terpolymers, quad polymers, and the like). Examples of suitable polysaccharides may include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), xanthan, scleroglucan, succinoglycan, diutan, and any combinations thereof.

Suitable synthetic polymers may include, but are not limited to, acrylamide ethyltrimethyl ammonium chloride, acrylamide, acrylamido alkyl trialkyl ammonium salt, methacrylamido-alkyl trialkyl ammonium salt, acrylamidomethylpropane sulfonic acid, acrylamidopropyl trimethyl ammonium chloride, acrylic acid, dimethylaminoethyl methacrylamide; dimethylaminoethyl methacrylate, dimethylaminopropyl methacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, any copolymer thereof, any derivative thereof, and any combination thereof. In certain embodiments, the viscosifying agent comprises an acrylamide/2-(methacryloyloxy)ethyltrimethylammonium methyl sulfate copolymer. In certain embodiments, the viscosifying agent may comprise an acrylamide/2-(methacryloyloxy)ethyltrimethylammonium chloride copolymer. In certain embodiments, the viscosifying agent may comprise a derivatized cellulose that comprises cellulose grafted with an allyl or a vinyl monomer.

Additionally, polymers, including homopolymers, copolymers, terpolymers, and quad polymers, that comprise one or more functional groups (e.g., hydroxyl, cis-hydroxyl, carboxylic acids, derivatives of carboxylic acids, sulfate, sulfonate, phosphate, phosphonate, amino, or amide groups) may be used as viscosifying agents.

The viscosifying agent may be present in any of the treatment fluids described herein in an amount sufficient to provide the desired viscosity. In some embodiments, the viscosifying agents (i.e., the polymeric material) may be present in an amount in the range of from about a lower limit of about 0.1%, 0.5%, 1%, 1.5%, 2%, 2.5%, 3%, 3.5%, 4%, and 4.5% to an upper limit of about 10%, 9.5%, 9%, 8.5%, 8%, 7.5%, 7%, 6.5%, 6%, 5.5%, 5%, and 4.5% by weight of the treatment fluid, encompassing any value and subset therebetween. In certain embodiments, the viscosifying agents may be present in an amount in the range of from about 0.15% to about 2.5% by weight of the treatment fluid.

In those embodiments of the present invention where it is desirable to crosslink the viscosifying agent, any of the first through sixth treatment fluids may comprise one or more crosslinking agents, in addition to the viscosifying agent. The crosslinking agents may comprise a borate ion, a metal ion, or similar component that is capable of crosslinking at least two molecules of the viscosifying agent. Examples of suitable crosslinking agents may include, but are not limited to, borate ions, magnesium ions, chelated zirconium (IV) ions, chelated titanium (IV) ions, aluminum ions, antimony ions, chromium ions, iron ions, copper ions, zinc ions, and any combination thereof. These ions may be provided by providing any compound that is capable of producing one or more of these ions. Examples of such compounds may include, but are not limited to, ferric chloride, boric acid, disodium octaborate tetrahydrate, sodium diborate, pentaborates, ulexite, colemanite, magnesium oxide, zirconium lactate, zirconium triethanol amine, zirconium triethanolamine lactate, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine chloride, titanium acetylacetonate, aluminum lactate, aluminum citrate, antimony compounds, chromium compounds, iron compounds, copper compounds, zinc compounds, and any combination thereof.

In certain embodiments, the crosslinking agent may be formulated to remain inactive until it is "activated" by, among other things, certain conditions in the treatment fluid (e.g., pH, temperature, etc.) and/or interaction with some other substance. In some embodiments, the activation of the crosslinking agent may be delayed by encapsulation with a coating (e.g., a porous coating through which the crosslinking agent may diffuse slowly, or a degradable coating that degrades downhole) that delays the release of the crosslinking agent until a desired time or place. The choice of a particular crosslinking agent will be governed by several considerations including but not limited to, the type of viscosifying agent included, the molecular weight of the viscosifying agent(s), the conditions in the subterranean formation being treated, the safety handling requirements, the pH of the treatment fluid, temperature, and/or the desired delay for the crosslinking agent to crosslink the viscosifying agent molecules.

When included, suitable crosslinking agents may be present in any of the treatment fluids useful in the methods of the present invention in an amount sufficient to provide the desired degree of crosslinking between molecules of the viscosifying agent. In certain embodiments, the crosslinking agent may be present in any of the treatment fluids of the present disclosure in an amount in the range of a lower limit of about 0.005%, 0.055%, 0.105%, 0.155%, 0.205%, 0.255%, 0.305%, 0.355%, 0.405%, 0.455%, and 0.505% to an upper limit of about 1%, 0.950%, 0.900%, 0.850%, 0.800%, 0.750%, 0.700%, 0.650%, 0.600%, and 0.500% by weight of the treatment fluid, encompassing any value and subset therebetween. In certain embodiments, the crosslinking agent may be present in any of the treatment fluids of the present disclosure in an amount in the range of from about 0.05% to about 1% by weight of the treatment fluid. The amount of crosslinking agent included in any of the treatment fluids may depend upon, among other things, the temperature conditions of a particular application, the type of viscosifying agents used, the molecular weight of the viscosifying agents, the desired degree of viscosification, the pH of the treatment fluid, and the like.

In some embodiments, any of the treatment fluids herein may be foamed (alone or in addition to a viscosifying agent and/or crosslinking agent) to aid in suspending the degradable particulates and the proppant particulates. As used herein, the term "foam" refers to a two-phase composition having a continuous liquid phase and a discontinuous gas phase. In some embodiments, any of the treatment fluids may be foamed by the addition of a gas, and a foaming agent.

Suitable gases for use in conjunction with the embodiments of the present disclosure may include, but are not limited to, nitrogen, carbon dioxide, air, methane, helium, argon, and any combination thereof. Each gas may be beneficial in certain subterranean environments. By way of nonlimiting example, carbon dioxide foams may have deeper well capability than nitrogen foams because carbon dioxide emulsions have greater density than nitrogen gas foams so that the surface pumping pressure required to reach a corresponding depth is lower with carbon dioxide than with nitrogen. Moreover, the higher density may impart greater particulate transport capability.

In some embodiments, the quality of the foamed treatment fluid may range from a lower limit of about 5%, 10%, 25%, 40%, 50%, 60%, or 70% gas volume to an upper limit of about 95%, 90%, 80%, 75%, 60%, or 50% gas volume, encompassing any value and subset therebetween. Most preferably, the foamed treatment fluid may have a foam quality from about 85% to about 95%, or about 90% to about 95%.

Suitable foaming agents for use in conjunction with the embodiments of the present disclosure may include, but are not limited to, cationic foaming agents, anionic foaming agents, amphoteric foaming agents, nonionic foaming agents, or any combination thereof. Nonlimiting examples of suitable foaming agents may include, but are not limited to, surfactants like betaines, sulfated or sulfonated alkoxylates, alkyl quarternary amines, alkoxylated linear alcohols, alkyl sulfonates, alkyl aryl sulfonates, C10-C20 alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, and the like, any derivative thereof, or any combination thereof. Foaming agents may be included in any of the foamed treatment fluids at concentrations ranging typically from a lower limit of about 0.05%, 0.1%, 0.2%, 0.3%, 0.4%, 0.5%, 0.6%, 0.7%, 0.8%, 0.9%, and 1% to an upper limit of about 2%, 1.9%, 1.8%, 1.7%, 1.6%, 1.5%, 1.4%, 1.3%, 1.2%, 1.1%, and 1% of the liquid component by weight (e.g., from about 0.5 to about 20 gallons per 1000 gallons of liquid).

In some embodiments, one or more of the treatment fluids of the present disclosure may additionally comprise an additive selected from the group consisting of a salt, a weighting agent, an inert solid, a fluid loss control agent, an emulsifier, a dispersion aid, a corrosion inhibitor, an emulsion thinner, an emulsion thickener, a surfactant, a particulate, a pH control additive, a breaker, a biocide, a stabilizer, a chelating agent, a scale inhibitor, a gas hydrate inhibitor, an oxidizer, a reducer, a friction reducer, a clay stabilizing agent, and any combination thereof.

In various embodiments, systems configured for delivering the treatment fluids (collectively including each of the first through sixth treatment fluids) described herein to a downhole location are described. In various embodiments, the systems can comprise a pump fluidly coupled to a tubular, the tubular containing the treatment fluids described herein. It will be appreciated that while the system described below may be used for delivering either or both of the pad fluid and/or IMA treatment fluid, each treatment fluid is delivered separately into the subterranean formation.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluids to a subterranean formation at or above a fracture gradient of the subterranean formation, but it may also be used in cases where fracturing is not desired. In some embodiments, the high pressure pump may be capable of fluidly conveying particulate matter, such as the micro-proppant particulates and/or the micro-proppant particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

Figure 2:
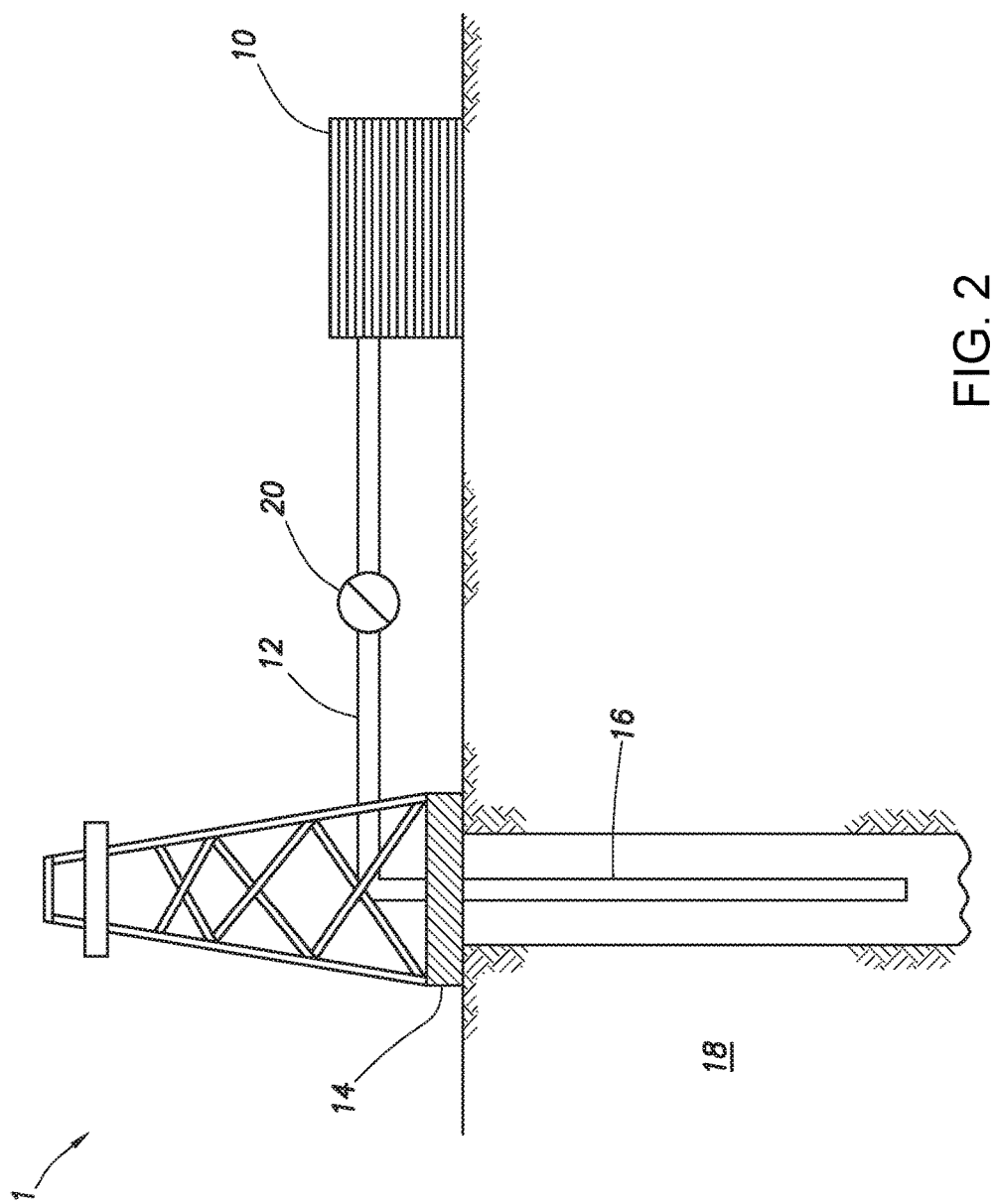
FIG. 2 depicts an embodiment of a system configured for delivering the treatment fluids of the embodiments described herein to a downhole location.

FIG. 2 shows an illustrative schematic of a system that can deliver the treatment fluids of the present disclosure to a downhole location, according to one or more embodiments. It should be noted that while FIG. 2 generally depicts a land-based system, it is to be recognized that like systems may be operated in subsea locations as well. As depicted in FIG. 2, system 1 may include mixing tank 10, in which the treatment fluids of the embodiments herein may be formulated. The treatment fluids may be conveyed via line 12 to wellhead 14, where the treatment fluids enter tubular 16, tubular 16 extending from wellhead 14 into subterranean formation 18. Upon being ejected from tubular 16, the treatment fluids may subsequently penetrate into subterranean formation 18. Pump 20 may be configured to raise the pressure of the treatment fluids to a desired degree before introduction into tubular 16. It is to be recognized that system 1 is merely exemplary in nature and various additional components may be present that have not necessarily been depicted in FIG. 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 2.

Embodiments disclosed herein include:

Embodiment A: A method of increasing fracture complexity comprising: (a) introducing into a subterranean formation a first treatment fluid comprising a first base fluid and micro-proppant particulates at a rate and pressure sufficient to create or enhance at least a first main fracture, having at least a first branch fracture extending from the first main fracture and at least a first microfracture extending from the first branch fracture in a first treatment zone, wherein the micro-proppant particulates are deposited into the first microfracture, the micro-proppant particulates having a particle size distribution sufficient to form a at least a partial monolayer therein; (b) introducing into the subterranean formation a second treatment fluid comprising a second base fluid and micro-degradable particulates, wherein the micro-degradable particulates are deposited into a mouth of the first microfracture, the micro-degradable particulates having a particle size distribution sufficient to form at least a partial fluid seal therein; (c) introducing into the subterranean formation a third treatment fluid comprising a third base fluid and branch-proppant particulates, wherein the branch-proppant particulates are deposited into the first branch fracture, the branch-proppant particulates having a particle size distribution sufficient to form at least a partial monolayer therein; (d) introducing into the subterranean formation a fourth treatment fluid comprising a fourth base fluid and branch-degradable particulates, wherein the branch-degradable particulates are deposited into a mouth of the first branch fracture, the branch-degradable particulates having a particle size distribution sufficient to form at least a partial fluid seal therein; (e) introducing into the subterranean formation a fifth treatment fluid comprising a fifth base fluid and main-proppant particulates, wherein the main-proppant particulates are deposited into the first main fracture, the main-proppant particulates having a particle size distribution sufficient to form at least a partial monolayer therein; (f) introducing into the subterranean formation a sixth treatment fluid comprising a sixth base fluid and main-degradable particulates, wherein the main-degradable particulates are deposited into the first main fracture mouth, the main-degradable particulates having a particle size distribution sufficient to form at least a partial fluid seal therein; and (g) degrading at least a portion of the micro-degradable particulates, the branch-degradable particulates, and the main-degradable particulates.

Embodiment A may have one or more of the following additional elements in any combination:

Element A1: Further comprising repeating steps (a) and (b) prior to step (c) to generate at least a second microfracture extending from the first branch fracture, wherein the micro-proppant particulates in the first treatment fluid are deposited into the second microfracture to form at least a partial monolayer therein, and wherein the micro-degradable particulates in the second treatment fluid are deposited into the mouth of the second microfracture to form at least a partial fluid seal therein.

Element A2: Further comprising repeating steps (c) and (d) prior to step (e) to generate at least a second branch fracture extending from the first main fracture, wherein the branch-proppant particulates in the third treatment fluid are deposited into the second branch fracture to form a multilayer therein, and wherein the branch-degradable particulates in the fourth treatment fluid are deposited into the second branch fracture mouth to form at least a partial fluid seal therein.

Element A3: Wherein the micro-proppant particulates have a particle size distribution in the range of from about 1 μm to about 150 μm.

Element A4: Wherein the micro-degradable particulates have a particle size distribution in the range of from about 0.1 µm to about 100 µm.

Element A5: Wherein the branch-proppant particulates have a particle size distribution in the range of from about 50 µm to about 350 µm.

Element A6: Wherein the branch-degradable particulates have a particle size distribution in the range of from about 50 µm to about 300 µm.

Element A7: Wherein the main-proppant particulates have a particle size distribution in the range of from about 200 µm to about 1250 µm.

Element A8: Wherein the main-degradable particulates have a particle size distribution in the range of from about 150 µm to about 1200 µm.

Element A9: Further comprising a wellhead with a tubular extending therefrom and into the subterranean formation, and a pump fluidly coupled to the tubular, wherein a fluid selected from the group consisting of the first treatment fluid, the second treatment fluid, the third treatment fluid, the fourth treatment fluid, the fifth treatment fluid, the sixth treatment fluid, and any combination thereof is introduced into the subterranean formation through the tubular.

By way of non-limiting example, exemplary combinations applicable to Embodiment A include: A with A1 and A2; A with A1 and A3-A9; A with A2 and A3-A9; A with A1, A2, and A3-A9; A with A4, A5, and A9; A with A5, A6, and A7; A with A7 and A8.

Embodiment B: A method of increasing fracture complexity comprising: (a) introducing into a subterranean formation a first treatment fluid comprising a first base fluid and micro-proppant particulates at a rate and pressure sufficient to create or enhance at least a first main fracture, having at least a first branch fracture extending from the first main fracture and at least a first microfracture extending from the first branch fracture in a first treatment zone, wherein the micro-proppant particulates are deposited into the first microfracture, the micro-proppant particulates having a particle size distribution sufficient to form at least a partial monolayer therein; (b) introducing into the subterranean formation a second treatment fluid comprising a second base fluid and micro-degradable particulates, wherein the micro-degradable particulates are deposited into a mouth of the first microfracture, the micro-degradable particulates having a particle size distribution sufficient to form at least a partial fluid seal therein; (c) introducing into the subterranean formation a third treatment fluid comprising a third base fluid and branch-proppant particulates, wherein the branch-proppant particulates are deposited into the first branch fracture, the branch-proppant particulates having a particle size distribution sufficient to form a multilayer therein; (d) introducing into the subterranean formation a fourth treatment fluid comprising a fourth base fluid and branch-degradable particulates, wherein the branch-degradable particulates are deposited into a mouth of the first branch fracture, the branch-degradable particulates having a particle size distribution sufficient to form at least a partial fluid seal therein; (e) introducing into the subterranean formation a fifth treatment fluid comprising a fifth base fluid and main-proppant particulates, wherein the main-proppant particulates are deposited into the first mail fracture, the main-proppant particulates having a particle size distribution sufficient to form a multilayer therein; and (g) degrading at least a portion of the micro-degradable particulates and the branch-degradable particulates.

Embodiment B may have one or more of the following additional elements in any combination:

Element B1: Further comprising repeating steps (a) and (b) prior to step (c) to generate at least a second microfracture extending from the first branch fracture, wherein the micro-proppant particulates in the first treatment fluid are deposited into the second microfracture to form at least a partial monolayer therein, and wherein the micro-degradable particulates in the second treatment fluid are deposited into the second microfracture mouth to form at least a partial fluid seal therein.

Element B2: Further comprising repeating steps (c) and (d) prior to step (e) to generate at least a second branch fracture extending from the first main fracture, wherein the branch-proppant particulates in the third treatment fluid are deposited into the second branch fracture to form a multilayer therein, and wherein the branch-degradable particulates in the fourth treatment fluid are deposited into the second branch fracture mouth to form at least a partial fluid seal therein.

Element B3: Wherein the micro-proppant particulates have a particle size distribution in the range of from about 1 µm to about 150 µm.

Element B4: Wherein the micro-degradable particulates have a particle size distribution in the range of from about 0.1 µm to about 100 µm.

Element B5: Wherein the branch-proppant particulates have a particle size distribution in the range of from about 50 µm to about 350 µm.

Element B6: Wherein the branch-degradable particulates have a particle size distribution in the range of from about 50 µm to about 300 µm.

Element B7: Wherein the main-proppant particulates have a particle size distribution in the range of from about 200 µm to about 1250 µm.

Element B8: Wherein the main-degradable particulates have a particle size distribution in the range of from about 150 µm to about 1200 µm.

Element B9: Further comprising a wellhead with a tubular extending therefrom and into the subterranean formation, and a pump fluidly coupled to the tubular, wherein a fluid selected from the group consisting of the first treatment fluid, the second treatment fluid, the third treatment fluid, the fourth treatment fluid, the fifth treatment fluid, and any combination thereof is introduced into the subterranean formation through the tubular.

By way of non-limiting example, exemplary combinations applicable to Embodiment B include: B with B1 and B2; B with B1 and B3-B9; B with B2 and B3-B9; B with B1, B2, and B3-B9; B with B2, B4, and B6; B with B5, B7, and B8.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method of increasing fracture complexity comprising:
   (a) introducing into a subterranean formation a first treatment fluid comprising a first base fluid and micro-proppant particulates at a rate and pressure sufficient to create or enhance at least a first main fracture, having at least a first branch fracture extending from the first main fracture and at least a first microfracture extending from the first branch fracture in a first treatment zone,
      wherein the micro-proppant particulates are deposited into the first microfracture, the micro-proppant particulates having a particle size distribution sufficient to form at least a partial monolayer therein;
   (b) introducing into the subterranean formation a second treatment fluid comprising a second base fluid and micro-degradable particulates,
      wherein the micro-degradable particulates are deposited into a mouth of the first microfracture, the micro-degradable particulates having a particle size distribution sufficient to form at least a partial seal therein;
   (c) introducing into the subterranean formation a third treatment fluid comprising a third base fluid and branch-proppant particulates,
      wherein the branch-proppant particulates are deposited into the first branch fracture, the branch-proppant particulates having a particle size distribution sufficient to form at least a partial monolayer therein;
   (d) introducing into the subterranean formation a fourth treatment fluid comprising a fourth base fluid and branch-degradable particulates,
      wherein the branch-degradable particulates are deposited into a mouth of the first branch fracture, the branch-degradable particulates having a particle size distribution sufficient to form at least a partial seal therein;
   (e) introducing into the subterranean formation a fifth treatment fluid comprising a fifth base fluid and main-proppant particulates,
      wherein the main-proppant particulates are deposited into the first main fracture, the main-proppant particulates having a particle size distribution sufficient to form at least a partial monolayer therein;
   (f) introducing into the subterranean formation a sixth treatment fluid comprising a sixth base fluid and main-degradable particulates,
      wherein the main-degradable particulates are deposited into the first main fracture mouth, the main-degradable particulates having a particle size distribution sufficient to form at least a partial seal therein; and
   (g) degrading at least a portion of the micro-degradable particulates, the branch-degradable particulates, and the main-degradable particulates.

2. The method of claim 1, further comprising repeating steps (a) and (b) prior to step (c) to generate at least a second microfracture extending from the first branch fracture,
   wherein the micro-proppant particulates in the first treatment fluid are deposited into the second microfracture to form at least a partial monolayer therein, and
   wherein the micro-degradable particulates in the second treatment fluid are deposited into the mouth of the second microfracture to form at least a partial seal therein.

3. The method of claim 1, further comprising repeating steps (c) and (d) prior to step (e) to generate at least a second branch fracture extending from the first main fracture,
   wherein the branch-proppant particulates in the third treatment fluid are deposited into the second branch fracture to form a multilayer therein, and
   wherein the branch-degradable particulates in the fourth treatment fluid are deposited into the second branch fracture mouth to form at least a partial seal therein.

4. The method of claim 1, wherein the micro-proppant particulates have a particle size distribution in the range of from about 1 µm to about 150 µm.

5. The method of claim 1, wherein the micro-degradable particulates have a particle size distribution in the range of from about 0.1 µm to about 100 µm.

6. The method of claim 1, wherein the branch-proppant particulates have a particle size distribution in the range of from about 50 µm to about 350 µm.

7. The method of claim 1, wherein the branch-degradable particulates have a particle size distribution in the range of from about 50 µm to about 300 µm.

8. The method of claim 1, wherein the main-proppant particulates have a particle size distribution in the range of from about 200 µm to about 1250 µm.

9. The method of claim 1, wherein the main-degradable particulates have a particle size distribution in the range of from about 150 µm to about 1200 µm.

10. The method of claim 1, further comprising a wellhead with a tubular extending therefrom and into the subterranean formation, and a pump fluidly coupled to the tubular,
    wherein a fluid selected from the group consisting of the first treatment fluid, the second treatment fluid, the third treatment fluid, the fourth treatment fluid, the fifth treatment fluid, the sixth treatment fluid, and any combination thereof is introduced into the subterranean formation through the tubular.

11. A method of increasing fracture complexity comprising:
    (a) introducing into a subterranean formation a first treatment fluid comprising a first base fluid and micro-proppant particulates at a rate and pressure sufficient to create or enhance at least a first main fracture, having at least a first branch fracture extending from the first main fracture and at least a first microfracture extending from the first branch fracture in a first treatment zone, wherein the micro-proppant particulates are deposited into the first microfracture, the micro-proppant particulates having a particle size distribution sufficient to form at least a partial monolayer therein;
(b) introducing into the subterranean formation a second treatment fluid comprising a second base fluid and micro-degradable particulates,
wherein the micro-degradable particulates are deposited into a mouth of the first microfracture, the micro-degradable particulates having a particle size distribution sufficient to form at least a partial seal therein;
(c) introducing into the subterranean formation a third treatment fluid comprising a third base fluid and branch-proppant particulates,
wherein the branch-proppant particulates are deposited into the first branch fracture, the branch-proppant particulates having a particle size distribution sufficient to form a multilayer therein;
(d) introducing into the subterranean formation a fourth treatment fluid comprising a fourth base fluid and branch-degradable particulates,
wherein the branch-degradable particulates are deposited into a mouth of the first branch fracture, the branch-degradable particulates having a particle size distribution sufficient to form at least a partial seal therein;
(e) introducing into the subterranean formation a fifth treatment fluid comprising a fifth base fluid and main-proppant particulates,
wherein the main-proppant particulates are deposited into the first mail fracture, the main-proppant particulates having a particle size distribution sufficient to form a multilayer therein; and
(g) degrading at least a portion of the micro-degradable particulates and the branch-degradable particulates.

12. The method of claim 11, further comprising repeating steps (a) and (b) prior to step (c) to generate at least a second microfracture extending from the first branch fracture,
wherein the micro-proppant particulates in the first treatment fluid are deposited into the second microfracture to form at least a partial monolayer therein, and
wherein the micro-degradable particulates in the second treatment fluid are deposited into the second microfracture mouth to form at least a partial seal therein.

13. The method of claim 11, further comprising repeating steps (c) and (d) prior to step (e) to generate at least a second branch fracture extending from the first main fracture,
wherein the branch-proppant particulates in the third treatment fluid are deposited into the second branch fracture to form a multilayer therein, and
wherein the branch-degradable particulates in the fourth treatment fluid are deposited into the second branch fracture mouth to form at least a partial seal therein.

14. The method of claim 11, wherein the micro-proppant particulates have a particle size distribution in the range of from about 1 µm to about 150 µm.

15. The method of claim 11, wherein the micro-degradable particulates have a particle size distribution in the range of from about 0.1 µm to about 100 µm.

16. The method of claim 11, wherein the branch-proppant particulates have a particle size distribution in the range of from about 50 µm to about 350 µm.

17. The method of claim 11, wherein the branch-degradable particulates have a particle size distribution in the range of from about 50 µm to about 300 µm.

18. The method of claim 11, wherein the main-proppant particulates have a particle size distribution in the range of from about 200 µm to about 1250 µm.

19. The method of claim 11, wherein the main-degradable particulates have a particle size distribution in the range of from about 150 µm to about 1200 µm.

20. The method of claim 11, further comprising a wellhead with a tubular extending therefrom and into the subterranean formation, and a pump fluidly coupled to the tubular,
wherein a fluid selected from the group consisting of the first treatment fluid, the second treatment fluid, the third treatment fluid, the fourth treatment fluid, the fifth treatment fluid, and any combination thereof is introduced into the subterranean formation through the tubular.

* * * * *